United States Patent [19]
Pauls et al.

[11] 4,348,251
[45] Sep. 7, 1982

[54] SYSTEM FOR APPLYING BINDING AGENTS TO FIBROUS WEBS

[75] Inventors: Walter L. Pauls, Appleton; Raymond A. Dunleavy, III, Neenah, both of Wis.

[73] Assignee: American Can Company, Greenwich, Conn.

[21] Appl. No.: 218,251

[22] Filed: Dec. 19, 1980

[51] Int. Cl.³ .......................... B29D 27/00; B29J 5/00
[52] U.S. Cl. ................................... 156/500; 118/410; 156/244.21; 156/285; 264/518; 425/113; 425/516
[58] Field of Search .................... 56/244.21, 285, 62.2, 56/62.6, 500; 264/45.8, 46.3, 518; 425/85, 90, 91, 92, 97, 113, 324.1, 325, 447, 448, 449, 504, 516; 118/410; 427/209, 385.5

[56] References Cited
U.S. PATENT DOCUMENTS

| 3,042,573 | 7/1962 | Roberts | 156/285 |
| 3,331,728 | 7/1967 | Lane | 156/285 |
| 3,348,989 | 10/1967 | Roberts | 156/285 |
| 3,600,750 | 8/1971 | Stroszynski | 425/113 |
| 3,609,810 | 10/1971 | Coghill | 425/113 |
| 4,159,355 | 6/1979 | Kaufmen | 427/385.5 |
| 4,292,271 | 9/1981 | Buob et al. | 264/518 |

Primary Examiner—Caleb Weston
Attorney, Agent, or Firm—Harry W. Hargis, III; William A. Aguele

[57] ABSTRACT

A method and system for applying a foamed binding agent to a fibrous web is disclosed. The invention is characterized by the use of an extruder having an upper lip extending 1/16 to ¼ inch beyond the lower lip, and by the drawing of a vacuum beneath the applied foam, said characteristics being critical to the formation of a uniform foam layer atop the web. A second, more substantial vacuum is then applied beneath the web to essentially completely draw the binding agent into the web thereby providing substantial inter-fiber bonding.

5 Claims, 4 Drawing Figures

SYSTEM FOR APPLYING BINDING AGENTS TO FIBROUS WEBS

FIELD OF THE INVENTION

This invention relates to the application of binding agents to dry formed, fibrous webs. More specifically, the present invention discloses a method of application of said binding agents in the form of an extruded foam film, and, collaterally, to a system or apparatus employed in carrying out the method.

BACKGROUND OF INVENTION

In current practice dry-formed fibrous webs are prepared by dispensing a loose continuum of fibers onto a moving foraminous support surface to form a loose web. Because the loose web as intitally laid lacks integrity, a binding agent must be incorporated into the final web product. One method of incorporation admixes a particulate adhesive with the fibers prior to their deposition onto the forming surface, the adhesive subsequently being activated by application of moisture and/or heat. In another method adhesive is sprayed onto the fibers as they are airborne within the distributor, or as they are in transit from the distributor to the forming surface. Yet another technique is to dry-lay the fibers onto a moving foraminous wire, and subsequently to spray a binder solids bearing emulsion onto each side of the loose fibrous web, each application of the spray being followed by a drying step to at least partially dry and perhaps partly cure the binder. If necessary, the bonded web is finally heated to completely cure the fibrous web porduct. An improved embodiment of this latter technique is described in the commonly assigned pending patent application Ser. No. 108,022 filed Dec. 28, 1979, now U.S. Pat. No. 4,292,271 entitled "Methods of Applying Bonding Materials Onto Fibrous Webs."

The use of spray nozzles as described in U.S. Pat. No. 4,292,271, even with the utilization of vacuum to promote penetration, has several inherent disadvantages. Nozzles tend to plug with binder solids resulting in non-uniform coverage of the bonding material. While this problem is alleviated by larger sized nozzles, such nozzles cause greater usage of binder material. Further, the spray itself is not completely uniform in that is comprises discreet droplets of bonding agent, said droplets imparting to the web a mottled or dimpled appearance. At high nozzle discharge velocities, especially as such may develop with partially plugged orifices, the force of the droplets onto the web can compromise web integrity notwithstanding the presence of the bonding agent. To ensure a completely covered web, the spray area must extend beyond the outer edge of the web, including therefor portions of the carrier wire itself. This increases clean-up requirements and costs substantially, as well as the quantity of bonding agent used. Finally, the airborne or atomized spray cannot be confined, and eventually covers other parts of the apparatus thereby aggravating the clean-up problem.

In contradistinction to the spray nozzle means above described, the present invention utilizes extruder means to apply a continuous film of foamed binding agent onto the web. Unlike U.S. Pat. No. 4,159,355 granted to Kaufman, the applicator does not require an interior configuration of special design, but does have critical geometric relationships relating to its outlet dimensions.

SUMMARY OF INVENTION

It is an object of this invention to provide an improved method of applying a foamed layer of a binding agent to a dry laid, loose fibrous web.

Another object of this invention is to provide a layer of binding agent to both sides of said web, at least one side being a foam layer.

A further object of this invention is to obtain uniform deposition of a binding agent onto each side of a fibrous web.

An additional object of the invention is to reduce the overall quantity of binding agent required on dry-laid fibrous webs.

Collaterally, it is an object of the invention to provide a system by which the application of the foamed binding agent may be carried out.

These and other objects will be more clearly understood upon an inspection of the drawings and a reading of the detailed description, a summary of which follows.

The fibrous web is formed by dispensing the individual fibers from a distributor header onto a moving foraminous support means or forming wire. Compaction of the web downstream of the header by means of consolidation rolls imparts some integrity to the web enabling transfer to a second moving foraminous support, hereinafter the first carrier wire. The first (top) side of the web is treated with the binding agent, preferably a latex type material, at the first bond station. While an extruder type applicator laying down a film of binding agent foam is preferable for this first bonding operation, loose webs having little integrity generally cannot withstand the force of a vacuum applied to the underside of the web, said vacuum being a necessary feature of the foam application system of the invention. For this reason conventional spray means are often used except in those instances where web integrity permits the preferred use of foam. However, it is also preferred that the bulk of the binding agent be applied at the second bond station. Hence, the use of spray means at the first bond station does not detract from the advantages of the invention.

The once bonded web is then dried at least partially to eliminate tackiness resulting from the application of binding agent. Inverting of the web is accomplished by its transfer to a second carrier wire as is known in the art. With the second side now in top position, the web passes beneath an extruder which uniformly deposits a layer of foam thereon, the velocity of the foam being essentially equal to the speed of the second carrier wire. To ensure that the applied foam layer remains unitary with the web, it is critical that a slight vacuum be pulled just downstream of the extruder outlet, the vacuum being between 0.1 to 1.0 inch of water. Substantial penetration of the foam layer into the web to provide the internal bonding necessary to prevent ply separation is obtained by drawing a second vacuum, between about 2 and 15 inches of mercury, at a convenient downstream location. The twice bonded web is then dried and cured before being wound-up on a parent roll.

Notwithstanding the utilization of the first stage vacuum subsequent to foam laydown, it was found that the foam still tended to separate, forming blotchy areas of uncovered web. However, a unitary foam layer of uniform consistency was obtained by extending the upper lip of the extruder outlet a distance of from about 1/16 to about ¼ inch. Conversely, an extruder having said lip extension did not provide uniform foam laydown without the application of said first stage vacuum. Thus, the system disclosed herein requires both to be present for successful operation.

DETAILED DESCRIPTION OF INVENTION

Figure 1:
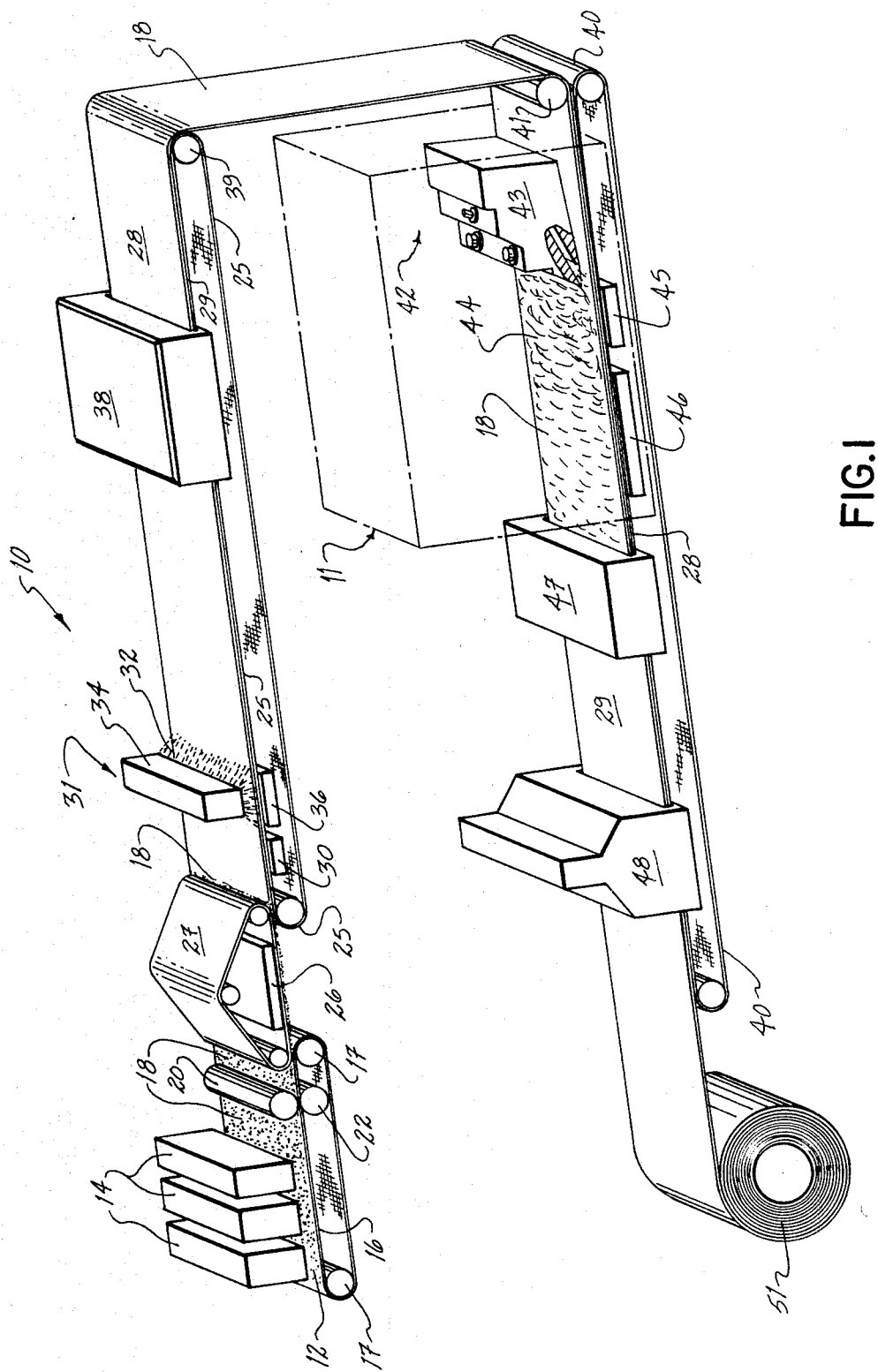
FIG. 1 is a schematic view with a portion broken away of a dry laid web forming line, the foam application system of the present invention contained within the dashed lines.

FIG. 1 illustrates schematically a preferred embodiment of an apparatus, designated generally by numeral 10, for producing fibrous webs bonded on both sides with a binding agent. Numeral 11 denotes the foam application system of the present invention, said system enveloped by the dashed lines. System 11 may also be adopted for use with pre-existing air laid forming lines, replacing thereby either or both spray bonding stations subject to the below described constraints.

Referring to FIG. 1, loose fibrous web 18 is formed by depositing fibers 12 from one or more distributor headers 14 onto an endless, foraminous forming wire 16, said wire being supported and transported by rollers 17. Consolidation rolls 20, 22 compact the loose web 18 thereby providing the web with some integrity. The web 18 is then transferred to a first foraminous carrier wire 25 by means of transfer wire 27. Vacuum box 26 provides the upward force necessary to ensure that web 18 adheres to wire 27; vacuum box 30 removes the web from wire 27 and establishes it onto the carrier 25. While the forming wire 16 could be continued in lieu of carrier 25, the latter is often a coarser weave for ease of cleaning residue binding agent therefrom. The exposed surface of web 18 on carrier 25 is designated as the first side 28; the underlying surface as the second side 29.

The carrier 25 carries the web 18 beneath a first side 28 bonding station generally indicated by numeral 31. In this instance the bond station 31 is a spray applicator system 34, the binding agent 32 being applied to the surface 28. While not required with the spray type system, a vacuum box 36 can be used to provide greater penetration of the binding agent into the web, which, of course, gives the web even greater integrity at this stage. The vacuum applied is slight, being between about 0.1 to about 1.0 inches of water. Preferably, the vacuum box 36 is directly below the spray system 34.

While an extruder which lays down a foam film of the binding agent is the preferred applicator for bonding station 31, web characteristics at this point in the apparatus 10 mitigate against its general deployment. The newly formed web, particularly webs of low basis weight and high bulk, such as those whose end products are tissue and towel sheets, do not have significant interfiber bonding. Hence, strength is minimal, even through the web may have been consolidated previously, as by rollers 20, 22. Unlike spray applicators, the use of foam applicators requires that a slight vacuum be drawn beneath the web to prevent foam separation, to ensure uniform distribution, and to provide minimum penetration. Many webs do not have the requisite strength at bond station 31 to allow the draw of said vacuum. However, those webs which can withstand the vacuum, generally between 0.1 and 1.0 inch of water, preferably below 0.5 inches of water, can be treated with a foam layer in lieu of the spray 32 at bond station 31.

Even if the preferred foam applicator is not employed at the first bonding station 31, however, the substantial benefits of the invention are still realized by the utilization of the foam applicator at the second bonding station. These benefits are obtained because the bulk of the binding agent is preferably dispensed at the second bonding station where web integrity is substantially greater. In addition the concentration of binding agent solids in the emulsion sprayed onto the web at bond station 31 is preferably low, generally being between 15 and 20% by weight. The disadvantages then; namely, poor distribution, plugging, and waste, are less pronounced at the first bond station 31.

The web 18 leaving the first bonding station 31 has now been provided with a first binding agent layer, preferably, if consistent with web characteristics, of foamed binding agent, on surface 28. Because a certain amount of tackiness has been imparted to the web by the deposition, the web is at least partly dried in drying means, here a through air drier 38 of conventional design. When a water based latex binding agent is used, the drier 38 is set at a temperature between about 350° to about 380° F., the web being heated to between about 180° to about 200° F. The once-bonded, once dried web 18 leaves the drier at about the processing temperature, and contains less than approximately 5% moisture by weight, based on the total weight of the partially dried web. As carrier 25 passes around roll 39, the web 18 is transferred invertedly onto a second endless, foraminous carrier wire 40, surface 29 now being on top thereof. Carrier 40 transports the web 18 through the second bonding station 42, the second drier means 47 and through curing means 48, before being wound up on parent roll 51. Curing means 48 may be incorporated with drier 47, a cured web nevertheless being produced. It is also possible to transfer the web to a subsequent wire, said wire carrying the web through the curing means 48.

As the web 18 passes beneath the bonding station 42, here including the extruder 43 of proper design as hereinafter described, a layer of foamed binding agent 44 is applied to the surface 29. Initially, the foam contains a high volume of air or other gaseous fluid, the blow ratio being between 10 and 25, preferably between 15 and 20. Blow ratio is defined as the density of the unfoamed binding agent solution divided by the density of the foamed dispersion. Almost immediately, the air would diffuse to the atmosphere causing partial collapse of the foam, which, but for the vacuum drawn in vacuum box 45, would cause foam separation, forming blotchy areas on the surface 29. However, by drawing the vacuum, maintained at a level of between 0.1 to 1.0 inch of water, preferably less than 0.5 inch of water, at a point just downstream of extruder 43, foam integrity is retained. This level of vacuum is sufficient for only slight penetration of the foam into the web, no more than several tenths of a millimeter. Hence, the interior of the web still contains essentially unbonded fibers. For this reason the web is passed over a second vacuum box 46 located somewhat downstream of station 42. The level of this vacuum is more substantial, being between 2 and 15, preferably between 5 and 10, inches of mercury, and allows the binding agent to permeate the web essentially in its entirety.

A tracer dye placed in the foam of station 42 has shown that binding agent has greatest concentration near the surface 29, as would be expected, but also has appreciable quantities of binding agent even proximate to the surface 28. Binding agent applied at bonding station 31 was not tinted, and therefore could not account for the levels of binding agent proximate to surface 28.

It should be appreciated, as stated above, that the foam system designated generally as numeral 11 could also be employed at bond station 31 with certain webs in lieu of the spray means 34. However, should a foam system be used at bond station 31, it is not necessary, and is actually deleterious, to use a second vacuum box, for example, such as vacuum box 46 used at bond station 42. However, a vacuum box equivalent to box 45 is required.

While the slight vacuum is deemed to be critical in preventing foam separation on the surface 29 of the web, and while the second vacuum applied by means of vacuum box 46 is important for substantial binding agent penetration, yet another feature of system 11 has been found to be essential. This feature relates to the design of the extruder 43 used in applying the foam, one embodiment being illustrated in FIGS. 2, 3 and 4.

Figure 2:
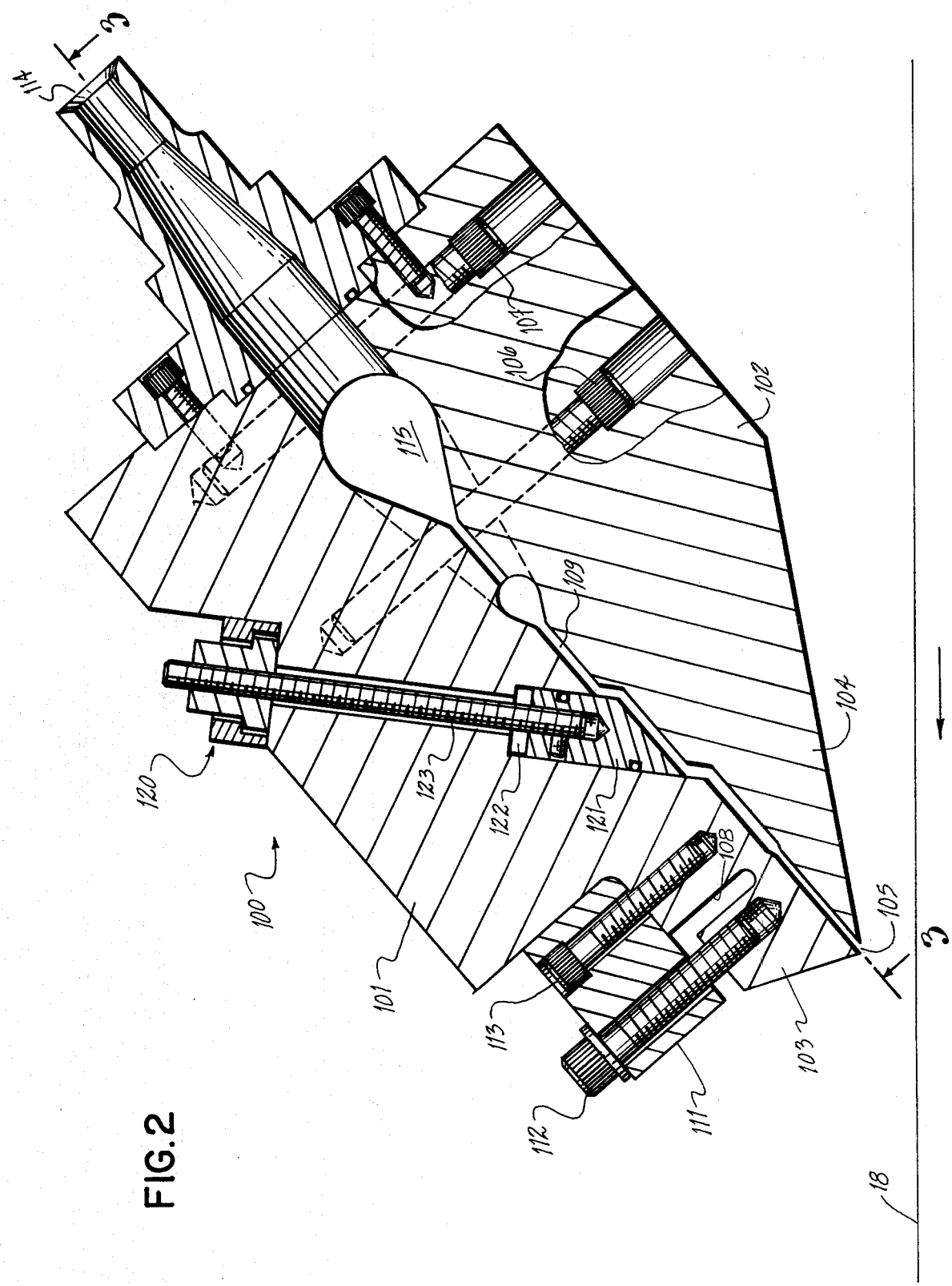
FIG. 2 is a sectional view of one embodiment of an extruder die available for use with the present invention.
Figure 3:
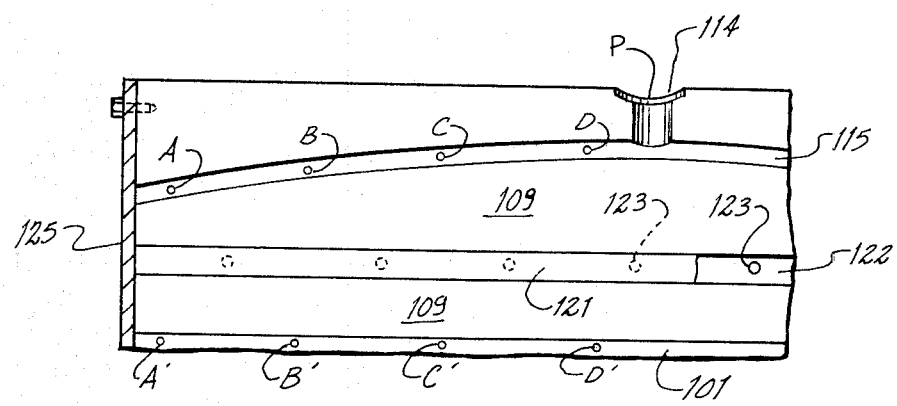
FIG. 3 is a cross sectional view of the die along section 3—3 of FIG. 2.

FIG. 2 is a sectional side view of a "coathanger" type extruder die 100 which can be used in applying the foam to web 18. However, other extruder designs, which incorporate the relevant critical feature, may also be used. The die body comprises essentially cast members 101, 102, which are held together by screws 106, 107. The members 101, 102 are cast such as to provide flow passageway 109 along their adjacent interior surfaces 116 and 117. Lip or section 103 of upper member 101 is partially separated therefrom by channel 108, and forms with lip or section 104 of lower member 102 the die outlet orifice 105. The outlet orifice 105 is elongate, and its width W can be varied by adjusting orifice adjusting screw 112, which also passes through stop limit member 111, said member being held in place by screw 113. Foam from a reservoir (not shown) is admitted to the die 100 through inlet 114, the foam passing through manifold 115 which is of the well known "coathanger" shape. This is seen most clearly in FIG. 3 a partial cross sectional view along section 3—3 of FIG. 2. Numeral 125 designates an extruder side plate. The flow passageway diameter can be varied by adjustment of the restrictor bar 121 located within aperture 122 by means of restrictor bar adjusting means 120, the screws 123 thereof adjusting bar 121 such that the pressure drops PAA', PBB', PCC' and PDD' are essentially equal. This ensure uniform velocities through the passageway 109 at points A', B', C' and D'.

Figure 4:
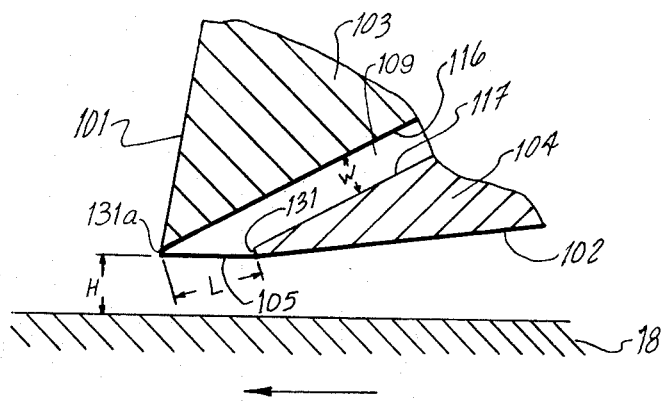
FIG. 4 is an enlarged detail view of the extruder die outlet orifice.

The critical feature of the extruder die 100 for the present invention is the outlet orifice 105, shown enlarged in FIG. 4. It is essential that the edge 131a of upper lip 103 extend beyond the edge 131 of lower lip 104 by at least 1/16" and no greater than ¼", the overlap dimension being designated by letter L. Preferably this dimension is 3/32 inch. By having the overlap L, the foam does not tend to roll or curl over the web 18, and a uniform disposition can be obtained. Note that upper lip 116 does not come in contact with the web 18.

While not critical, the angle of the passageway 109 to the web 18 is preferably between 2° and 25°, and the width, W, of orifice 105 is function of web speed and foam volumetric flow rate as will be hereinafter described. The height H of the die from the web is also not critical, and may vary from about ¼" to about 3", one inch being preferred.

Another critical feature of the invention is that the foam exiting the orifice 105 should be at a velocity approximately equal to the web velocity. Foam velocity is a function of volumetric flow rate and cross sectional orifice area, hence, of foam density and binder add on amounts. Typically, add on rates are between 3 and 6 pounds binder solids per ream (3,000 sq. ft.). The parameter most easily adjusted to balance the foam and carrier velocities is the blow ratio, that is the density ratio of unfoamed binding agent (in solution) and foamed binding agent. For example with a given add on rate of unfoamed binder solution of known density and a fixed orifice area and carrier speed, the blow ratio, $\psi$, can be calculated by the formula:

$$\psi = \frac{A_o V_c \rho_b}{W_b}$$

where
$W_b$ = binder add on rate, lbs. unfoamed binder solution/min.
$\rho_b$ = density of unfoamed binder solution, lbs./ft.³
$A_o$ = orifice area, ft.², and
$V_c$ = carrier velocity, ft./min.

Blow ratios are in the range of 10 to 25, and the other variables may well have to be adjusted to ensure operation in this range. Generally, however, orifice width W is about 0.010 to 0.050 inches, preferably between 0.015 to 0.030 inches, thus further narrowing the selection of operating variations.

It has also been found that in addition to the savings obtained by elimination of waste, the foam bonded products actually require less binding agent to achieve a corresponding degree of strength as compared to spray binding. The overall estimated savings in binding agent is in the order of 10 to 30%, depending on the particular web to which it is applied. It is believed that the reduction in binder usage is attributable to the uniformity of the foam layer onto the web, with penetration into the web being likewise uniform. Thus, the interior fibers are more completely bound and with less binding agent. Conversely, at the same add-on level CD wet tensile strength for a foam bonded web is greater. Another advantage is that the concentration of solids contained in a foam system can be greater than in an unfoamed emulsion. Hence, less drying is required with concomitent savings in energy costs.

Bonding materials which can be employed in the methods of this invention are selected from the group consisting of binder solids-containing solutions and emulsions and include any such bonding materials suitable for bonding fibers. As used herein "fibers" includes natural fibers, most desirably paper-making fibers, especially those whose average length is generally about ¼ inch or less, and/or synthetic fibers and filaments and combinations thereof. Bonding materials such as polyvinyl acetates, polyvinyl alcohols, starches, and dextrins can be employed. However, for webs comprised entirely or mostly of papermaking fibers, it is expected that the most satisfactory results will be obtained with water-based latex solids. Examples of such binding agents are acrylic, acrylic vinyl, styrene butadiene, and, most preferably, vinyl acetate-ethylene polymer-containing emulsions, some of the latter of which are commercially available for example, from Air Products and Chemicals, Inc. under its trademarks, Flexac, e.g., Flexac 180; Flexbond, e.g. Flexbond 330; Airflex, e.g. Airflex 100HS, 456, 105 and 120; Vinac, e.g., Vinac 880 and 881; and Vinar, e.g., Vinar 201 and 241. The preferred bonding material is Airflex 120 diluted with water. Preferably, to enhance foamability of the diluted latex emulsion an effective amount of a suitable surfactant is added, generally between 0.5 and 3.0% by weight. For use with the above mentioned binding agent materials, and in particular with Airflex 120, preferred surfactants are the anionic re-wetting agents sold as Aerosol OT and Deceresol OT, registered trademarks of and commercially available from American Cyanamid Company. Optionally, a suitable catalytic agent such as sodium bisulphate may be added to the system to promote cross-linking of the polymer material.

A suitable foam is prepared simply by vigorous agitation and the introduction of air as is well known in the art. Although the binding agent applied at each bond location need not be the same, for bonding papermaking fibers and forming fibrous web products such as wipers, preferably both agents are water-based latex types, and in most instances desirably they are of the same latex polymer type.

As obtained, water-based latex emulsions commonly contain from about 45% to about 60% by weight latex solids. As obtained, Airflex 120 might contain from about 45% to about 52% by weight latex solids, but usually, as received, it contains about 52% by weight latex solids.

The binder solids concentration of the second-applied binding material may be the same as that of the first-applied bonding material, but preferably it is greater than that of the first-applied bonding material. It has been found that fibrous webs comprised of softwood Kraft papermaking fibers previously spray bonded at bonding station 31, dried in drier 38, and transferred to carrier 40, and intended ultimately as web products of from about 30 to 50 lbs./rm. (3,000 sq. ft.) basis weight can be satisfactorily foam bonded at bond station 42 with a foamed latex solids-containing emulsion Airflex 120, said emulsion having a latex binder solids concentration from about 10% to about 30% by weight, preferably between about 15 to about 25%, and most preferably about 20% by weight, based on the total weight of the unfoamed emulsion applied to the web, and a blow ratio of between 10 and 25.

It can be stated generally then that the solids concentration of the first-applied binding agent, whether by foam or spray means, should be great enough to provide the integrity the particular apparatus configuration requires to permit continuous transfers at commercial speeds from carrer to carrier, yet not so great as to cause wasteful surface accumulations of solids and consequent reductions as to solids penetration and efficiency.

It is usually preferable to operate without a vacuum pressure at spray bonding station 31 because the vacuum tends to increase adherence of the once-bonded continuum to carrier 25 and increase separation and transfer problems. It has been found, however, that a slight vacuum pressure of 1.0 inch water or less may in certain applications be tolerable within the aforementioned solids concentration range of from about 15% to about 20% by weight to control overspray and to hold the loose web on and prevent it from being lifted from carrier 25 by the spray velocity imparted from spraying means 34. Of course, should the web 18 be of sufficient integrity to allow the use of this slight vacuum, foam bonding means of system 11 may be employed thereat as mentioned above.

The total amount of binder solids to be included in the web product is to be as low as possible. Practically, within limits and in accordance with this invention, many commercially acceptable high wet strength web products having CD wet tensiles of 750 grams per 3"×9" inch strips can be obtained with low as well with high solid add-on levels. As previously explained, high solids additions tend to accumulate on the web surface and prevent good solids penetration, which fact is a key to obtaining both acceptable tensile strengths and solids efficiencies.

Of the total binder solids desired to be included in the web product, the first-applied and the second-applied bonding materials may add the same percentage thereof, but preferably the first-applied bonding material adds to the web a relatively minor or low percentage, and the second-applied adds the rest, or a relatively major or higher percentage thereof. Minor here means from measurable effective fiber bonding amounts to percent by weight, and major means from 50% up to less than 100% by weight, based on the total weight of binder solids to be included in the fibrous web product.

For latex-bonded fibrous web products suitable for use as moderate-to-heavy wipers the first-applied emulsion, whether by spray or foam means, adds from about 20% to about 45% by weight, preferably about 30% to about 40% by weight, of the total binders solids to be added on to or included in the final fibrous web product. The second-applied foamed emulsion adds on the rest, i.e., from about 55% to about 80%, preferably about 60 to about 70% by weight of the total binder solids to be added onto or included in the fibrous web product. Although it has been found that below about 20% by weight solids, the once-bonded web tends to be too weak to transfer from a bonding station 31 carrier to a drier 38 carrier, desirably the solids add-on is as low as practicable at bonding station 31 where little or no vacuum is applied, and solids add-on is as great as possible at bonding station 42 where a high vacuum is applied to increase solids penetration. Of course, the solids level to be added at the respective first and second bonding stations and the total solids to be employed will vary depending form example on the apparatus and carrier configuration, its gentleness or severity with respect to web handling and treatment, the bonding effectiveness of the particular binder solids employed, and the basis weight, tensile strength, liquid absorption, feel and performance characteristics desired of the web product.

The methods of this invention can be better understood from the examples below comparing the conventional spray application method with method of this invention.

EXAMPLE I

In this example two fibrous webs of 100% wood pulp fibers were dry-laid on a forming wire, said webs having a basis weight of about 34 to 37 lbs./ream (3,000 sq. ft.) on a binding agent free basis. Each web was then bonded with a spray of an Air Products Airflex 120 latex emulsion which had a 17% solids concentration by weight, dried in a through air drier, and subsequently invertedly transferred to a second carrier wire.

The second surface of the first web was spray bonded, while the second surface of the second web was foam bonded in accordance with the present invention. The webs were then finally dried and cured in a through air drier. In each instance, the binding agent was the same Airflex 120 latex at a solids concentration (unfoamed) of 17% by weight. The foam had a blow ratio of 15.

Just downstream of the foam applicator, a vacuum of 0.2 inches of water was maintained to ensure uniform coverage of the web by the foam. Further downstream of the foam applicator a vacuum of 10 inches of mercury was drawn to pull the foam into the web. The foam extruder nip gap was 0.023 inches and the upper lip overlap was 3/32 inch. Line speed was a constant 220 feet/minute for each web.

Binder solids add-on rates were selected so as to obtain a product web of comparable strength as indicated in the table below.

|  | Web Portion 1 | Web Portion 2 |
|---|---|---|
| Method used | Spray on side two | Foam on side two |
| Binder Solids Add-on (lbs./rm.): |  |  |
| Side 1 | 5.55 | 3.70 |
| Side 2 | 5.55 | 5.51 |
| TOTAL | 11.10 | 9.23 |
| Basis weight (lbs./rm.) | 44.9 | 46.3 |
| CD Wet Tensile Strength (gms./3 in.) | 1000 | 996 |

As is evident from the data, the overall binder solids add-on level was reduced by about 17% from 11.10 to 9.23 lbs./rm. for webs of comparable basis weight and strength. This savings appeared at the first bond station, which decreases the drier load associated therewith, and alleviates significantly the cleaning problems referred to above.

EXAMPLE II

In this second example, the total add-on was equalized for each web to determine the effect of the present invention on comparative CD wet tensile strengths.

As in Example 1 the webs, now having a binder free basis weight of about 31 lbs./rm. (3,000 sq. ft.), were dry-laid, the first-side being treated with a spray of Airflex 120 at 23% solids concentration by weight. The second surface of the first web was spray bonded, and the second web foam bonded as before. Here, however, the first vacuum pulled under the extruder was 0.6 inches of water, while the second vacuum was 5 inches of mercury. The line speed was still 220 feet/minute and the lip overlap was 3/32 inch, but the extruder nip gap was now 0.027 inches. The foam blow ratio was 25.

The tabulated results are:

|  | Web Portion 1 | Web Portion 2 |
|---|---|---|
| Method used | Spray on side two | Foam on side two |
| Binder Solids Add-on (lbs./rm.): |  |  |
| Side 1 | 2.6 | 3.0 |
| Side 2 | 4.6 | 4.1 |
| TOTAL | 7.2 | 7.1 |
| Basis weight (lbs./rm.) | 38.8 | 38.5 |
| CD Wet Tensile Strength (gms./3 in.) | 622 | 961 |

This data shows that the foam bonded web had a 35% higher tensile strength at essentially equal binder add-on rates.

Although the invention has been described in detail above, it is intended that the invention be limited only in accordance with the claims appended below.

We claim:

1. An apparatus for applying binding agent as a foam to a fibrous web supported by a moving foraminous carrier wire, comprising:
    a foam extruder having means defining a flow passage terminating in an elongate orifice extending transversely of the direction of movement of said wire, said flow passage being inclined between about 2° and about 25° to the plane of said web in a direction opposite to the direction of wire movement,
    said elongate orifice including a pair of longer edges positioned at substantially the same distance of from about ¼ and about 3 inches above said web, and spaced one from the other, in the direction of wire movement, a distance of from about 1/16 inch to about ¼ inch,
    and a first vacuum means disposed beneath said wire, and, as respects the direction of wire movement, at a point just downstream of said elongate orifice, said first vacuum means being operative to draw a vacuum of from about 0.1 inch to about 1.0 inch of water.

2. Apparatus of claim 1, wherein there is further included a second vacuum means disposed beneath said wire, and downstream of said first vacuum means, said second vacuum means being operative to draw a vacuum of from about 2 inches to about 15 inches of mercury.

3. Apparatus of claim 2, wherein said first vacuum means draws a vacuum of from about 0.1 inch to about 0.5 inch of water, and said second vacuum means draws a vacuum of from about 5.0 inches to about 10.0 inches of mercury.

4. Apparatus of claim 3, wherein said longer edges are spaced one from the other about 3/32 inch.

5. Apparatus of claim 1, 2, 3, or 4, wherein said foam extruder is operative to discharge foam onto said web at a velocity corresponding substantially to the velocity of said carrier wire.

* * * * *